United States Patent [19]

Goodfellow et al.

[11] Patent Number: 4,866,510
[45] Date of Patent: Sep. 12, 1989

[54] DIGITAL VIDEO ENCODER

[75] Inventors: Douglas J. Goodfellow, Escondido, Calif.; Daniel N. Utberg, Randolph, N.J.

[73] Assignee: American Telephone and Telegraph Company, Murray Hill, N.J.

[21] Appl. No.: 251,283

[22] Filed: Sep. 30, 1988

[51] Int. Cl.$^4$ ...................... H04N 7/137; H04N 11/04
[52] U.S. Cl. ..................................... 358/13; 358/133; 375/27; 375/30
[58] Field of Search ........................... 358/12, 13, 133; 375/27, 30

[56] References Cited

U.S. PATENT DOCUMENTS

| | | | |
|---|---|---|---|
| 4,137,549 | 1/1979 | Ichida et al. | 358/13 |
| 4,536,880 | 8/1985 | Grallert | 375/30 |
| 4,541,102 | 9/1985 | Grallert | 375/30 |
| 4,656,500 | 4/1987 | Mori | 358/13 |
| 4,658,239 | 4/1987 | Grallert | 375/27 |

Primary Examiner—Howard W. Britton
Attorney, Agent, or Firm—J. S. Cubert

[57] ABSTRACT

A differential pulse code arrangement reduces the bit rate of a composite color video signal by sampling the video signal at a predetermined rate of m times the color sub-carrier frequency, predicting the present video signal sample from reconstructed past samples and forming signal representative of the prediction error in a first predictive loop. The bit rate is further reduced in a second predictive loop embedded in the first predictive loop by generating a signal predictive of the error signal and forming a signal corresponding to the difference between the error signal and the signal predictive thereof. The difference signal is quantized and encoded for transmission. The error signal is reconstructed by summing the quantized difference signal and the predicted error signal and the prediction of the error signal is formed responsive to the sequence of past reconstructed error signals. The m−1th video signal sample is then reconstructed by summing the reconstructed error signal and the signal predictive of the m−1th video sample and a signal predictive of the next occurring video sample is generated responsive to the sequence of past reconstructed video samples.

17 Claims, 6 Drawing Sheets

DIGITAL VIDEO ENCODER

BACKGROUND OF THE INVENTION

The invention relates to digital coding of video signals and more particularly to differential pulse code modulation arrangements for reducing the transmission bit rate of digital video signals.

Pulse code modulation is commonly used to transmit video signals in digital form to take advantage of the features of a digital channel. As is well known in the art, digital conversion of a video signal requires sampling the video signal at a prescribed rate related to its bandwidth and forming a digital code for each video sample. In PCM coding, each sample is transformed into a fixed number of binary bits preset to accommodate the expected extremes of the signal samples. Video signals, however, contain redundant information so that the present signal value may be predicted from previous values. DPCM (differential pulse code modulation) coding encodes the difference between the present signal sample and a value predicted from past signal samples. Since the video signal is predictable, the difference values obtained by subtracting the predicted value for the present sample from the present sample results in a smaller dynamic range. Consequently, the number of bits of a DPCM code per sample applied to the digital channel is significantly lower than the number of bits of an equivalent PCM code and the needed transmission rate can be reduced.

U.S. Pat. No. 4,137,549, issued to Ichida et al. Jan. 30, 1979, discloses DPCM coding apparatus for encoding a composite color television signal in which the difference between a digital code corresponding to a signal sample and a predicted value for the signal sample signal is formed for each successive sample of the video signal. The difference between the present video signal sample and the predicted value therefor is quantized to one of a set of discreet values and the quantized signal is coded for transmission over a digital channel. The predicted value is formed by adding the quantized signal to the past predicted value and modifying the result for horizontal and vertical correlation of past values of the video signal. In this way, the range of the quantized difference signal is reduced so that a lower bit rate can be used for transmission of the coded video signal.

U.S. Pat. Nos. 4,536,880, 4,541,102, and 4,658,239 issued to Grallert, Aug. 20, 1985, Sept. 10, 1985 and Apr. 14, 1987, respectively, all disclose differential pulse code modulation arrangements in which the speed of calculation of the differential codes is increased by various means so that the time needed to process each sample is minimized to accommodate a high transmission bit rate. U.S. Pat. No. 4,541,102 describes an arrangement in which a quantizer is preceded by three cascaded subtractors to speed up calculation. U.S. Pat. No. 4,658,239 describes an arrangement having a pair of series connected arithmetic units connected to the input of a quantizer with multipliers interconnecting the quantizer to the arithmetic units to increase processing speed. U.S. Pat. No. 4,536,880 describes another DPCM system in which the number of calculating units is reduced to enhance processing speed. While the foregoing schemes are well adapted to improve speed to DPCM coding, the problem of a further reduction in the number of bits per code word is not considered. It is an object of the invention to provide an improved video coder using multiple prediction to lower the number of bits for coding a video signal.

SUMMARY OF THE INVENTION

The foregoing object is achieved by using first predictive loop to obtain a signal corresponding to the error between the present video signal sample and a value predictive thereof and a second predictive loop embedded in within the first predictive loop to form a signal corresponding to the difference between the error signal from the first predictive loop and a value predictive of the error signal. Advantageously, the first predictive loop reduces the dynamic range in accordance with the correlation of past spatially related values of the video signal while the second predictive loop further reduces the dynamic range by predicting the error signals obtained from the first predictive loop and minimizing the error signal differences.

The invention is directed to differential pulse code arrangement for compressing a video signal in which a first predictor produces a signal predictive of the present sample of the video signal. The predictive signal is subtracted from the present video signal sample to form a predictive error signal in a first subtractor. A second predictor produces a second signal predictive of the predictive error signal from the first subtractor. The second signal is removed from the predictive error signal in a second subtractor. The second subtractor output is quantized and encoded for transmission. A reconstructed predictive error signal is formed by summing the quantized second subtractor output with the output of the second predictor and a reconstructed video signal is generated by summing the reconstructed predictive error signal with the output of the first predictor. The reconstructed predictive error signal and the reconstructed video signal are modified in accordance with the correlation of past spatially related reconstructed video signal samples to produce the next video signal predictive value and the next predictive error value.

According to one aspect of the invention, the correlation of past spatially related reconstructed predictive error signals includes selectively combining past reconstructed predictive signals in accordance with prescribed conditions of the present and preceding video signal lines to form the predictive value for the present video signal sample.

DETAILED DESCRIPTION

Figure 1:
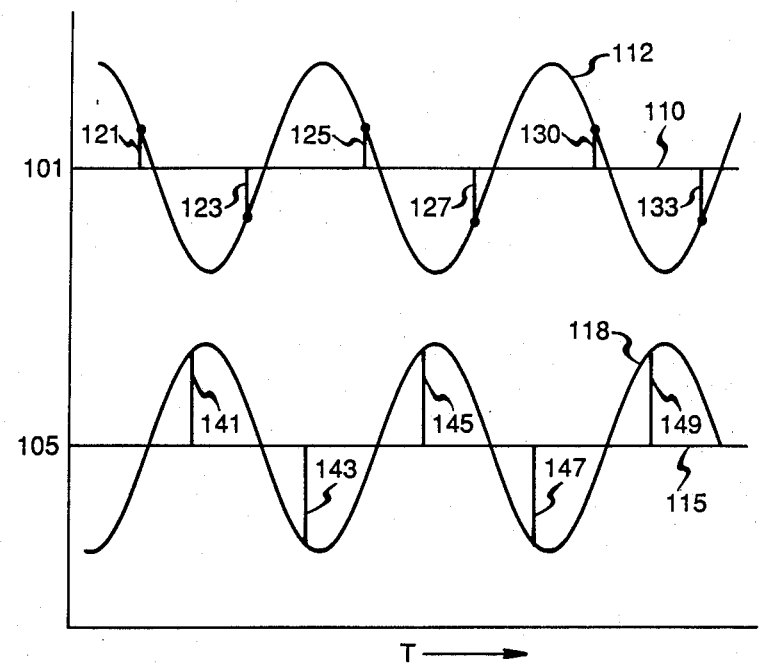
FIG. 1 shows waveforms illustrating two lines of a composite color signal.

As is well known, an NTSC composite color television signal includes a sinusoidal color signal of frequency fc modulating a luminance signal. The phase of the color signal controls the color while the amplitude of the luminance signal controls the density of the displayed pel. FIG. 1 shows successive lines 101 and 105 of a television frame. Waveform 110 represents the luminance component of line 101 while waveform 112 corresponds to the color component of line 101. Waveform 115 represents the luminance component of line 105 while waveform 118 corresponds to the color component of line 105. The color components of the two lines are 180 degrees out of phase. The composite color television signal may be applied to a digital channel by sampling the composite signal at a multiple, e.g., 3, of the color carrier frequency fc and converting the samples to digital codes. Since the information in the composite signal has a high degree of predictability, DPCM coding has been utilized to reduce the transmission bit rate. In DPCM type coding, a signal corresponding to a predicted value of current sample of the composite signal generated from past values is subtracted from the actual current sample. Video signal samples 121, 123, 125, 127, 130 and 133 are shown in video signal line 101 and signal samples 141, 143, 145, 147 and 149 are shown in line 105. There are three equally spaced samples for each cycle of the color sub-carrier and the phase of the sub-carrier determines the color at each sampling instant. Color changes occur if there is a difference between same phase signal samples, e.g., 121 and 125 or 141 and 145. In the event that the color remains the same, the difference is zero and small changes in color over a cycle produce relatively small difference values. The range of sample values over the cycle, however, is much larger. In general, the color component of a video signal is predictable from past sample values so that the range of difference signals is always small compared to the range of samples.

Figure 2:
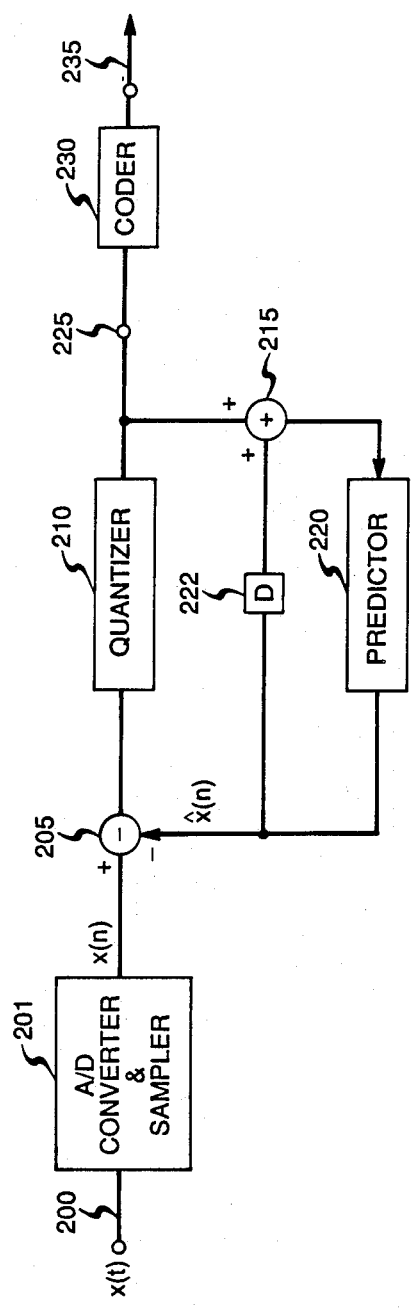
FIG. 2 is a block diagram of a prior art DPCM coding circuit.

FIG. 2 shows a prior art DPCM circuit adapted to convert a video signal to a sequence of DPCM codes for application to a transmission channel. The circuit of FIG. 2 comprises A/D converter and sampler 201, subtractor 205, quantizer 210, m bit delay 222, adder 215 and predictor 220. A video signal x(t) is applied to A/D and sampler circuit 201 wherein it is sampled at a rate of 3fc so that the output of A/D and sampler circuit 201 is a sequence of samples x(1), x(2), . . . x(n). The present sample x(n) is supplied to one input of subtractor 205 while a signal $\hat{x}(n)$ corresponding to a predicted value of the current sample x(n) is applied to the other input of the sutractor. The signal $\hat{x}(n)$ may be determined by correlating prior samples on the same line and correlating samples on the preceding line. The difference output from subtractor 205 representing the error between the actual and predicted values of the present sample is quantized in quantizer 210. The resulting quantized error signal is then encoded in coder 230 and the coded error signal is applied to transmission channel 235.

In order to generate a predicted value of the current sample x(n), the output of quantizer 210 is summed with the predicted value $\hat{x}(n)$ in adder 215 and the summed signal is applied to predictor 220. Predictor 220 generally comprises a multistage shift register which stores the successive samples of one or more lines of the composite television signal and an arithmetic unit adapted to combine selected samples from the shift register to form the predicted value $\hat{x}(n)$. The predictor may derive a signal from previous samples on the same line or may derive a signal from previous samples of both the present line and the preceding line to correlate selected spatial related samples of the video signal so as to form a signal indicative of the present sample x(n). The output of the DPCM circuit of FIG. 2 corresponds to a succession of quantized difference signals which, on the average, has a smaller dynamic range than the directly coded samples x(n).

Figure 3:
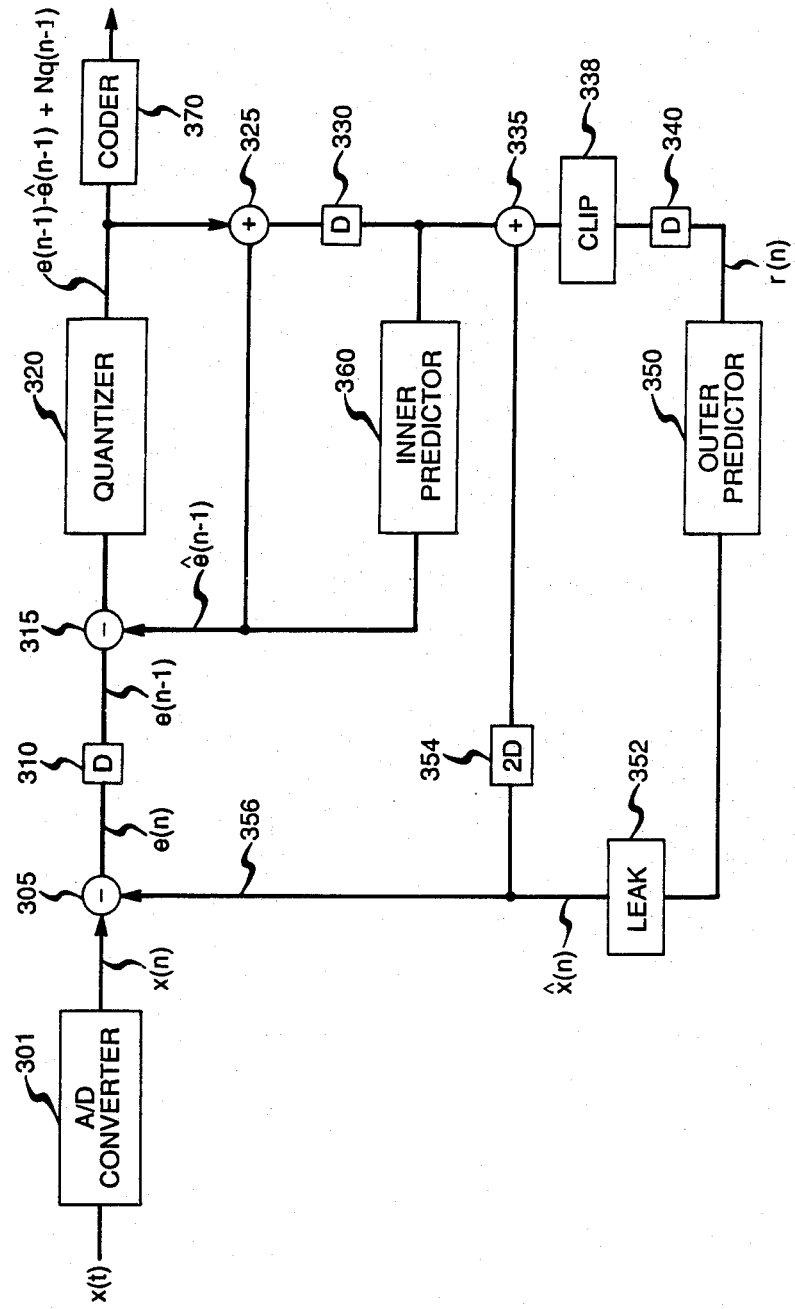
FIG. 3 is a block diagram of a DPCM circuit for coding a composite color television signal illustrative of the invention.

While the circuit of FIG. 2 is successful in removing video signal redundancies by correlation of selected spatially related samples, we have found that an additional reduction in the number of bits in each transmitted digital code may be effected by embedding a further predictive circuit within the predictive arrangement of FIG. 2. The circuit of FIG. 2 is generally effective to reduce the transmission bit rate of an NTCS composite television signal to 45 mbs. This bit rate reduction permits transmission of three independent television signals on a 150 mbs digital channel. It is, however, often desired to provide four independent television signals. Consequently, a further reduction of transmission rate is needed. FIG. 3 shows a block diagram of a DPCM circuit illustrative of the invention in which there is a first predictive circuit based on spatial correlation and a second predictive arrangement embedded within the first predictive circuit to effect a further removal of video signal redundancy. The circuit of FIG. 3 may be used to reduce the transmission bit rate to 36 mbs so that four independent video signals can be multiplexed onto a single 150 mbs channel.

Referring to FIG. 3, sampler and analog to digital converter 301 is adapted to convert analog video signal x(t) into a succession of samples at three times the color sub-carrier frequency and to convert each sample into a corresponding digital code x(n). Subtractor 305 receives the current digital code x(n) from converter 301 and a predicted value $\hat{x}(n)$ for the digital code on lead 356. The subtractor combines these signals to form an error signal $$e(n) = x(n) - \hat{x}(n) \qquad (1)$$

representative of the difference between the predicted and actual values of the current video signal sample x(n). Outer predictor 350 is arranged as will be described to produce a predicted value from spatially related samples on the same and preceding composite color television signal lines. Consequently, error signal e(n) reduces the redundancy of color information in the video signal x(n) and results in fewer bits per coded signal e(n).

Signal e(n) after a delay of one sample in delay circuit 301 is applied to one input of subtractor 315 which also receives a predicted value of the error signal $\hat{e}(n-1)$ from predictor 360. The subtractor is adapted to remove redundancy remaining in the error signal e(n) after color change redundancy in the spatially related samples has been removed in outer predictor 350. The subtractor operates to form the signal $$\delta e(n-1) = e(n-1) - \hat{e}(n-1). \qquad (2)$$

Inner predictor 360 is responsive to preceding samples as will be described so that the difference signal δe(n−1) from subtractor 315 is applied to quantizer 320 wherein a quantized value $$\delta e(n-1)q = e(n-1) - \hat{e}(n-1) + Nq(n-1) \quad (3)$$

is formed as is well known in the art. The quantizer may comprise a table in read only memory form which produces particular values for a defined range of δe(n−1) incident thereon and may include an adaptor that changes the produced values based on the magnitude of the input to the quantizer. The quantized output is coded for transmission in encoder 370 and applied to a transmission channel which may be an optical link. The output of the quantizer is added to the output of inner predictor 360 in adder 325 to form the signal $$e(n-1) + Nq(n-1) \quad (4)$$

since the ê(n−1) component of the signal from quantizer 320 cancels the predicted value output from predictor 360. The output of adder 325 delayed one sample in delay element 330 is supplied to the input of predictor 360 and is modified in the predictor to form the next error predictive signal ê(n−1).

The output of delay 330 is also applied to one input of adder 335 wherein it is added to the predictive signal delayed by two samples in delay element 354. The signal from adder 335 is then $$x(n-2) + Nq(n-2) = \hat{x}(n-2) + e(n-2) + Nq(n-2) \quad (5)$$

where $$e(n-2) = x(n-2) - \hat{x}(n-2). \quad (6)$$

The output of adder 335 is clipped as is well known in the art in clipper circuit 338 to maintain prescribed limits, delayed by one sample time in delay element 340 and applied to outer perdictor 350 as the reconstructed signal $$r(n) = x(n-3) + Nq(n-3). \quad (7)$$

Predictor 350 is operative to modify the signal x(n−3)+Nq(n−3) in response to the preceding samples on the present and preceding lines to form a predictive version of the next occurring video sample from sampler and A/D converter 301. Leak circuit 352 is adapted to provide a constant reduction factor which prevents error signal build up in the outer prediction loop.

Figure 5:
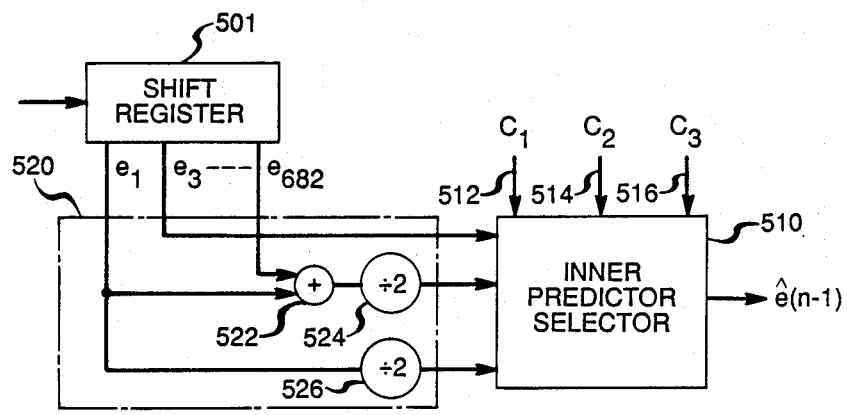
FIG. 5 depicts a block diagram of a circuit that may be used as the inner predictor in the arrangement of FIG. 3.
Figure 7:
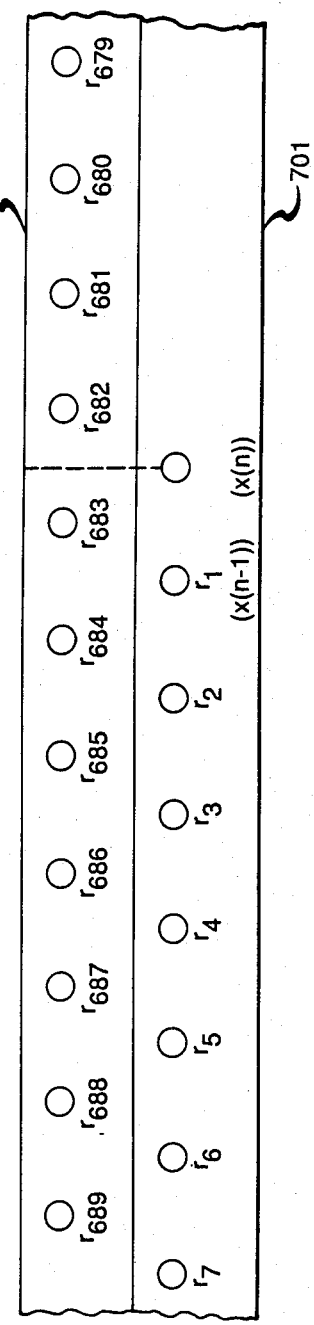
FIG. 7 shows the spatial and phase arrangement of signal sampling times illustrating the operation of the predictors of FIGS. 4 and 5.
Figure 4:
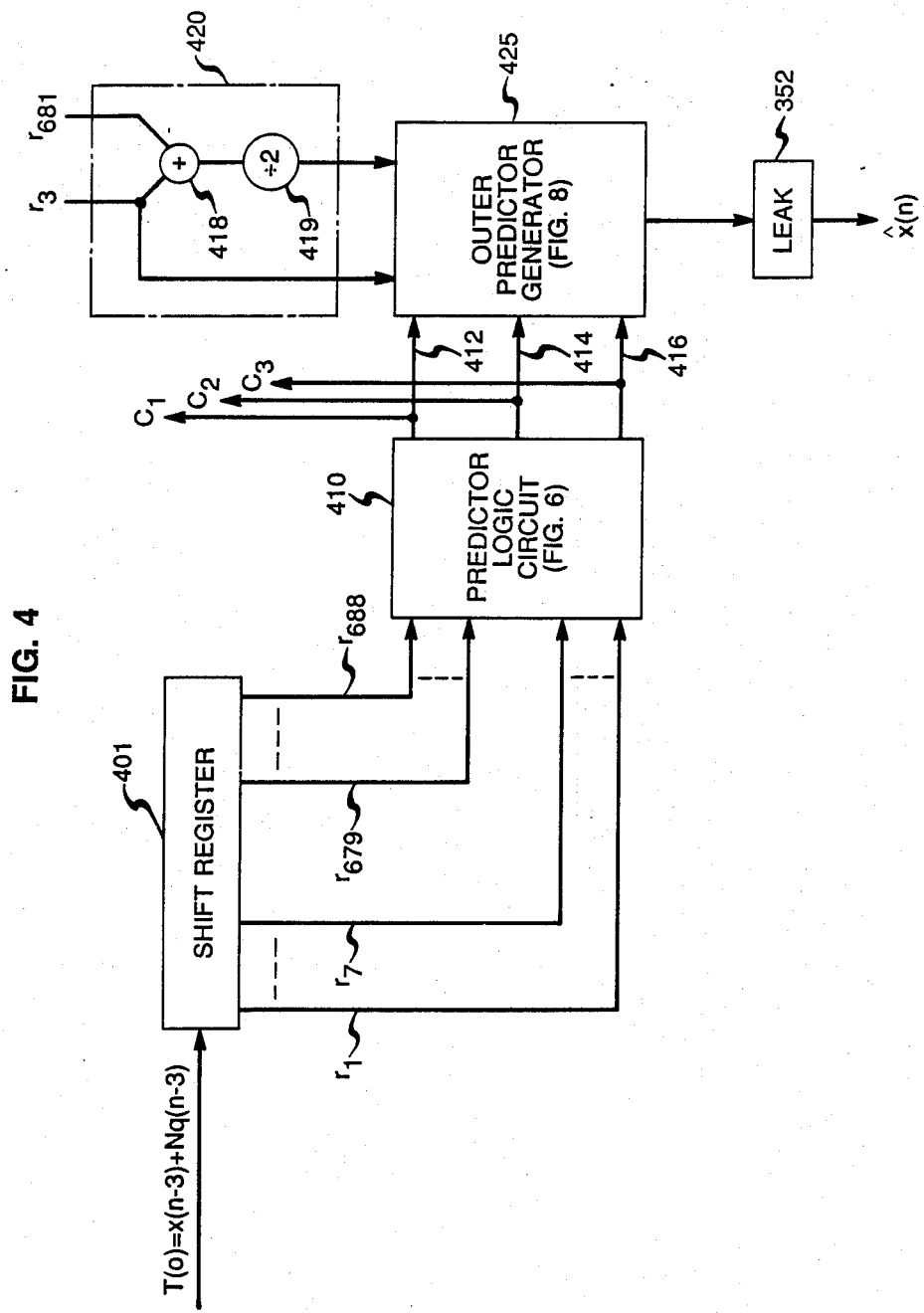
FIG. 4 depicts a block diagram of a circuit that may be used as the outer predictor in the arrangement of FIG. 3.

FIG. 4 illustrates a circuit that may be used as outer predictor 350 in FIG. 3, and FIG. 5 shows a circuit that may be employed as inner predictor 360 in FIG. 3. Each of these circuits uses reconstructed values of preceding sample instants that are illustrated in FIG. 7. Waveform 701 of FIG. 7 defines the present sampling instant at which signal sample x(n) occurs and the preceding sampling instants n−1, n−2, . . . , n−7 at which reconstructed values r1, r2, . . . r7 of the present line of the composite television signal appear. Waveform 705 defines sampling instants n−679, n−680, . . . n−689 of the preceding line at which reconstructed values r679, r680, . . . r689 occur. The present sampling instant n corresponds to the midpoint between preceding line sampling instants n−682 and n−683.

Figure 6:
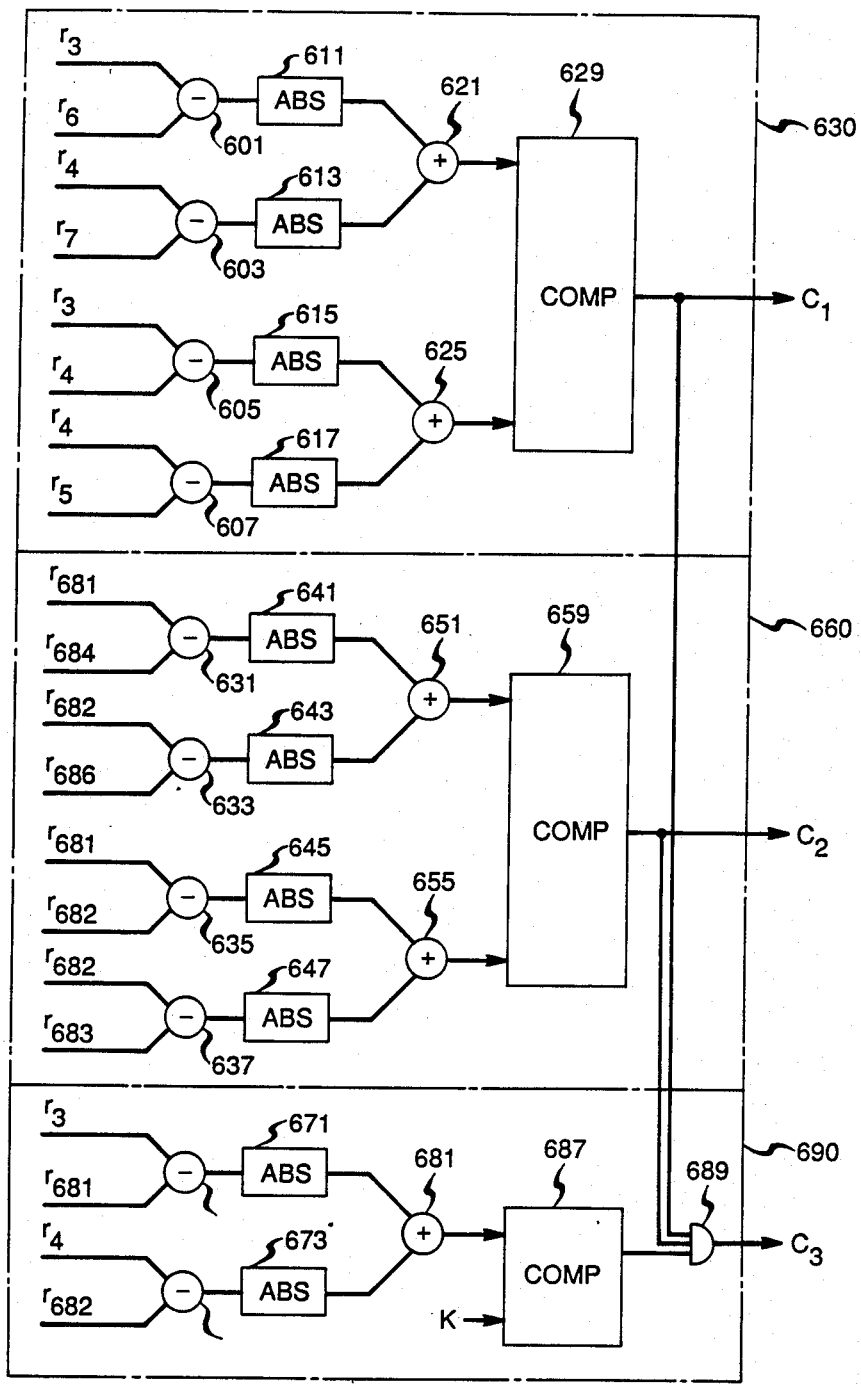
FIG. 6 shows a more detailed block diagram of the predictor logic circuit of FIG. 4.

Referring to FIG. 4, outer predictor 350 includes multistage shift register 401 and prediction control logic 410. Shift register 401 receives the reconstructed signal r(n) from delay 340 in FIG. 3 and provides outputs corresponding to reconstructed values r1 through r7 and r679 through r688, as illustrated in waveforms 701 and 705 in FIG. 7. The various reconstructed values are combined in prediction control logic circuit 410 to determine control signals c1, c2 and c3, which control signals are applied to the address lines of outer predictor generator 425 via leads 412, 414 and 416 and to inner predictor generator 510 of FIG. 5 via leads 512, 514 and 516. The prediction control logic circuit shown in greater detail in FIG. 6 is used to determine the three parameters to control the formation of the predicted signal x̂(n) and ê(n−1). Logic circuit 630 is adapted to provide an output indicative of presence or absence of color in the present video signal line 705. This is done by comparing the reconstructed values of the present line in accordance with the criterion $$|r3-r6| + |r4-r7| \leq |r3-r4| + |r4-r5|. \quad (8)$$

Reconstructed value r3 and r6 occur at sampling instants at the same phase in the color sub-carrier as do reconstructed values r4 and r7. Reconstructed values r3 and r4, and r4 and r5 occur at adjacent sampling instants which are at different phases of the color sub-carrier. In a scan line with a color component, the differences between r3 and r6 as well as between r4 and r7 on the left side of equation 8 are relatively small compared to the differences between different phase adjacent reconstructed values on the right side of equation 8. Consequently, if equation 8 is true, the present line is very likely to have a color component.

In logic circuit 630, reconstructed value r6 is subtracted from reconstructed value r3 in subtractor 601 and the absolute value of the difference is formed in absolute value circuit 611. Reconstructed value r7 is subtracted from reconstructed value r4 in subtractor 603 and the absolute value of the difference is formed in absolute value circuit 613. The outputs of absolute value circuits 611 and 613 are summed in adder 621 and the resultant is applied to one input of comparator 629. Subtractor 605 is used to form the difference signal r3−r4, and subtractor 607 is used to form the difference signal r4−r5. The absolute values of these difference signals are generated in absolute value circuits 615 and 617, and the sum of the absolute values from circuits 615 and 617 produced in adder 625 is applied to the other input of comparator 629. Comparator 629 produces a true C1 signal indicating color in the present line when the output of adder 625 is equal to or greater than the output of adder 621. Othewise, a false C1 signal is generated.

Logic circuit 660 determines whether color is present in the preceding line of the composite color television signal by combining the reconstructed values of the preceding line according to the relationship $$|r681-r684| + |r682-r685| \leq |r681-r682| + |r682-r683|. \quad (9)$$

As shown in FIG. 7, reconstructed value r682 occurs at a sampling instant just above the current sample x(n) so that relationship 9 compares differences in the same phase reconstruction values of the preceding line with the differences in the different phase reconstruction values of the preceding line. These reconstructed values occur in the same region of the display as the present sample x(n). In FIG. 6, the same phase differences r681−r684 and r682−r685 are produced in subtractors 631 and 633. The absolute values of the differences are formed in absolute value circuits 641 and 643, and the sum of the absolute values generated in adder 651 is applied to one input of comparator 659. Similarly, the adjacent sample differences r681−r682 and r682−r683 are formed in subtractors 635 and 637. The absolute values of these differences produced in absolute value circuits 645 and 647 are summed in adder 655 and the resultant is supplied to the other input of comparator 659. When the output of adder 651 is less than or equal to the output of adder 655, signal C2 from comparator 659 is true indicating the presence of color in the preceding line of the composite color television signal.

Logic circuit 690 is adapted to determine whether the color in the preceding line is the same as the color in the present line by the relationship $$|r3-r681|+|r4-r682| \leq K \quad (10)$$

where K may be present threshold value, e.g., 10. r3 and r681 are same phase signals, and r4 and r682 are same phase signals so that the left side of relationship is relatively small in the event that there is no color boundary between the preceding and present lines. Subtractors 661 and 663 form the difference signals r3−r681 and r4−r682, respectively. The absolute values of these difference signals formed in circuits 671 and 673 are summed in adder 681 and the "same color" control signal is formed in comparator 687. And gate 689 provides a true C3 control signal when C1, C2 and the output of comparator 687 are true. This condition corresponds to the same color present in both preceding and present lines of the composite color television signal.

Referring to FIG. 4, control signals C1, C2 and C3 from predictor logic circuit 410 are applied to outer predictor generator 425 to control selection of a prediction value. The prediction value is one of a plurality of combinations of past reconstructed values obtained from shift register 401 and processed in combiner circuit 420. In FIG. 4, past reconstructed values r3 of the present line and r681 of the preceding line are supplied to combiner circuit 420. The combiner circuit generates the signals r3 and (r3+r681)/2 from the outputs of register 401. In the event that the present line is the same color as the preceding line so that C1, C2 and C3 are true, the present video signal sample occurs where there is little likelihood of color change. Outer predictor generator selector 425 then selects the value (r3+r681)/2 as the predicted video sample value x(n). This combination is the average of the last in phase past reconstructed value on the current line and an adjacent past reconstructed value of the preceding line. The same combination of past reconstructed values is selected if C1 and C2 are false indicating only a luminance signal in each of the preceding and present lines. When C3 is false but C1 and C2 are true indicating a color boundary between the present and preceding lines or C1 and C2 are different so that there is a change between color and luminance, r3 is selected as the output of outer predictor generator 425.

Referring to FIG. 5, shift register 501 receives the successive predictive error values from delay 330 in FIG. 3. Particular combinations of these predictive error values are generated in combiner circuit 520 and one of these combinations is selected in inner prediction selector 510 as the predictive error signal ê(n−1). Combiner 520 forms the signal e½ in divide by 2 circuit 526 and forms the signal (e3+e681)/2 in adder 522 and divide by 2 circuit 524.

The operation of inner prediction selector 510 is controlled by signals C1, C2 and C3 from predictor logic circuit 410 in FIG. 4. If (1) the present and preceding lines are the same color, signals C1, C2 and C3 are true or (2) the preceding line is color and the present line is luminance so that C1 is true while C2 is false, the last in phase predictive error signal e3 is selected as the predictive error signal ê(n−1). If both lines are luminance so that C1 and C2 are false, the average of adjacent signals of the present and preceding lines (e1+e681)/2 is output from inner predictor generator 510. Where, however, the present line is luminance and the preceding line is color so that C1 is false while C2 is true, the value e½ is output from generator 510. Of course, other combinations of past reconstructed video signal values and reconstructed predictive values may be chosen where found more suitable but in each case the combination is controlled by conditions determined from the present and preceding line video signal.

Figure 8:
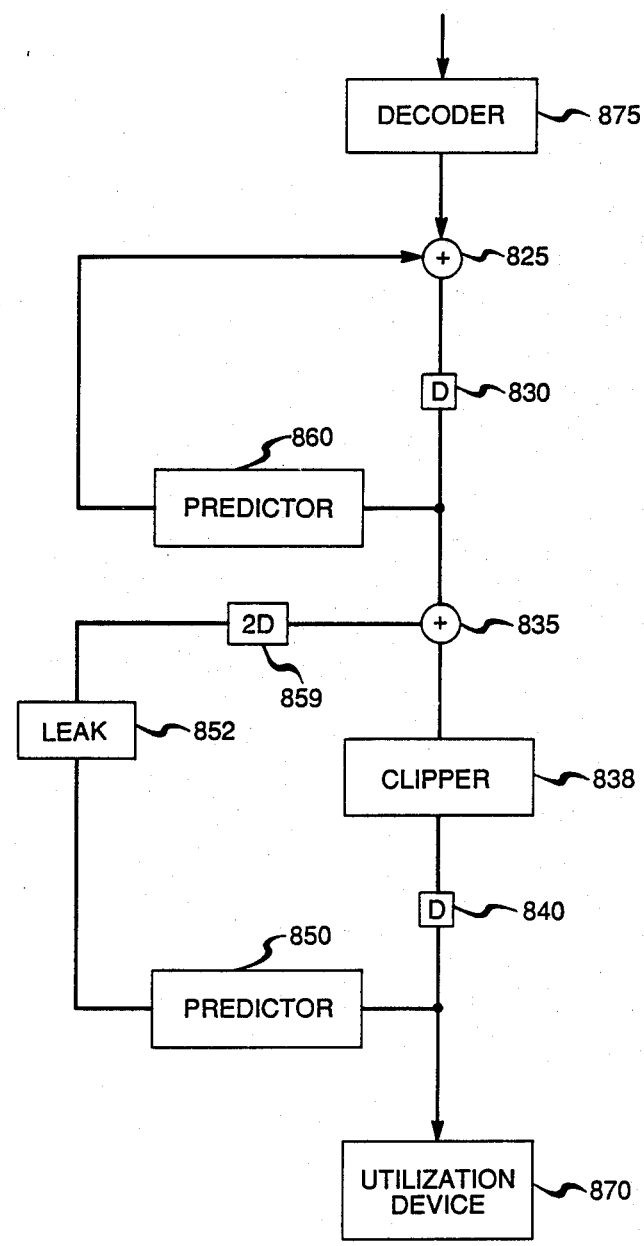
FIG. 8 depicts a block diagram of a DPCM circuit for decoding the signal formed in the circuit of FIG. 3.

A receiver used to decode the DPCM signal from a digital transmission channel that was produced by the circuit of FIG. 3 may use the substantially the same circuit to reconstruct the digital video signal applied to A/D converter and sampler 301 of FIG. 3. FIG. 8 depicts such a decoder. In FIG. 8, adder 825 receives the coded signal corresponding to $$e(n-1)-\hat{e}(n-1)+Nq(n-1) \quad (11)$$

produced in quantizer 320 of FIG. 3 from a transmission channel via decoding driver 875. Adder 825 is operative to sum the received signal with the ê(n−1) output of inner predictor 860 to generate a reconstructed predictive error signal $$e(n-1)+Nq(n-1). \quad (12)$$

The reconstructed predictive error signal is applied to the input of inner predictor 860 which operates in the same manner described with respect to FIGS. 4 and 5 to produce the predicted error signal ê(n−1) and is also supplied to one input of adder 835. Adder 835, in turn, sums the predicted video value from leak circuit 852 with the output of delay 830 to form the signal $$\hat{x}(n-2)+Nq(n-2) \quad (13)$$

The output of adder 835 is limited in range by clipper 838 as is well known in the art and the resulting output is applied to outer predictor 850 via delay 840. The operation of predictor 850 is the same as described with respect to outer predictor 350 in FIG. 3. The reconstructed value of the video signal $$\hat{x}(n-3)+Nq(n-3) \quad (14)$$

is the decoded video signal applied to utilization device 870. As aforementioned, the DPCM coding arrangement of the invention permits transmission of 4 independent video signals on a 150 mbs transmission channel so that the codes obtained from delay 840 may comprise a multiplexed sequence of digital codes from 4 separate video signals. Utilization device 870 may comprise a demultiplexor and one or more display terminals which are arranged to distribute the video signals to the display terminal as is well known in the art.

The invention has been described with reference to an illustrative embodiment thereof. It is apparent, however, to one skilled in the art that various modifications and changes may be made without departing from the spirit and scope of the invention.

We claims:

1. A color video signal coding arrangement comprising
    means for sampling a video signal at a predetermined rate of m times the color sub-carrier frequency;
    first predictor means having an input and an output for generating a signal predictive of the present sample of the video signal;
    a first subtractor having a first input coupled to the video signal sampling means and a second input coupled to the output of the first predictor means for forming a video error signal representative of the difference between the present video signal sample and the signal predictive thereof;
    second predictor means having an input and an output for generating a signal predictive of the video error signal;
    a second subtractor having a first input coupled to the output of the first subtractor and a second input coupled to the output of the second predictor means for generating a signal representative of the difference between the video error signal and the signal predictive thereof;
    a quantizer having an input coupled to the output of the second subtractor and an output for quantizing the difference signal from the second subtractor;
    first summing means having a first input coupled to the output of the quantizer and a second input coupled to the output of the second predictor for summing the quantized difference signal and the signal predictive of the video error signal from second predictor output to form a reconstructed difference signal; and
    second summing means having a first input coupled to the output of the first summing means and a second input coupled to the output of the first predictor means for summing the reconstructed difference signal and the signal predictive of the m−1th preceding video signal sample to form a reconstructed video signal sample;
    said first predictor means comprising means for storing a sequence of preceding reconstructed video signal samples received at its input, means for selecting a plurality of preceding reconstructed video signal samples, and means responsive to the selected preceding reconstructed video signal samples for forming the signal predictive of the present video sample;
    and said second predictor means comprising means for storing a sequence of preceding reconstructed difference signals received at its input, means for selecting a plurality of preceding reconstructed difference signals, and means responsive to the preceding reconstructed video signals and the preceding reconstructed difference signals for forming the signal predictive of the error signal from the first subtractor.

2. A color video signal coding arrangement according to claim 1 wherein the means for selecting the plurality of preceding reconstructed video signal samples in the first predictor means comprises:
    first means for determining the presence of a color component in the present line of video signal samples,
    second means for determining the presence of a color component in the preceding line of video signal samples, and
    third means for determining the presence of the same color in the present and preceding lines of video signal samples, and
    said means for forming a signal predictive of the present video signal sample comprises means for generating a plurality of combinations of the selected preceding reconstructed video signals and means responsive to said first, second and third color determining means for selecting one of the plurality of combinations of preceding reconstructed video signal samples.

3. A color video signal coding arrangement according to claim 2 wherein the means for forming a signal predictive of the error signal comprises means for generating a plurality of combinations of the selected preceding reconstructed difference signals and means responsive to said first, second and third color determining means for selecting one of the plurality of combinations of preceding reconstructed difference signals.

4. A color video signal coding arrangement according to claim 3 wherein
    the output of the first subtractor is coupled to the first input of the second subtractor by means for delaying the output of the first subtractor for one video signal sample time.

5. A color video signal coding arrangement according to claim 4 wherein
    the output of the first summing means is coupled to the input of the second predictor means and to the input of the second summing means by means for delaying the output of the first summing means for one video signal sample time.

6. A color video signal coding arrangement according to claim 5 wherein
    the output of the second summing means is coupled to the input of the first predictor means by means for clipping the output of the second summing means and means for delaying the clipped output of the second summing means by one video signal sample.

7. A color video signal coding arrangement according to claim 6 wherein
    the output of the first predictor means is coupled to the second input of the first substractor by means for periodically reducing the output of the first predictor means, and
    the output of the first predictor means is coupled to the second input of the second summing means by means for delaying the output of the first predictor means for m−1 video signal samples.

8. A color video signal coding arrangement comprising
    means for sampling a video signal at a predetermined rate corresponding to m times the color sub-carrier frequency;
    means for generating a signal predictive of each video signal sample;
    means coupled to the video signal sampling means and said video signal sample predictive generating means for forming an error signal representative of the difference between the present video signal sample and the signal predictive of the present video signal sample;

means for generating a signal predictive of the error signal;

means coupled to the error signal forming means and to the means for generating the signal predictive of the error signal for generating a signal corresponding to the difference between the error signal and the signal predictive thereof; and means connected to said error signal difference generating means for quantizing the difference signal;

the means for generating a signal predictive of the error signal comprising means coupled to the difference signal quantizing means and to the means for generating the signal predictive of the error signal for summing the quantized difference signal and the signal predictive of a preceding error signal to reconstruct the error signal and means responsive to the reconstructed error signal for forming the signal predictive of the next occurring error signal; and the means for generating a signal predictive of the each video signal sample comprising means for summing the reconstructed error signal for the m—1th preceding video sample and the signal predictive of the m—1th preceding video signal sample to generate a reconstructed video signal sample and means responsive to the reconstructed video signal sample for forming the signal predictive of the present video sample signal.

9. A color video signal coding arrangement according to claim 8 further comprising:

means responsive the reconstructed video signal sample for forming a plurality of combinations of past reconstructed video signal samples and a plurality of combinations of past reconstructed error signals; and wherein said means responsive to the reconstructed error signal for forming the signal predictive of the next occuring error signal comprises means responsive to preceding reconstructed video signal samples for selecting one of the plurality of combinations of past reconstructed error signals as the signal predictive of the next occurring error signal.

10. A color video signal coding arrangement according to claim 9 wherein said means responsive to the reconstructed video sample signal for forming the signal predictive of the present video sample signal comprises means responsive to preceding reconstructed video signal samples for selecting a predetermined combination of past reconstructed video signal samples as the signal predictive of the next occuring video signal sample.

11. A color video signal coding arrangement according to claim 10 wherein said means for selecting a predetermined combination of past reconstructed video signal samples comprises:

means responsive to past reconstructed video signal samples of the currently occuring and preceding video signal lines for generating a plurality of control signals;

means responsive to the control signals for selecting a predetermined combination of past reconstructed video signal samples as the signal predictive of the present video sample signal; and means responsive to the control signals for selecting a predetermined combination of past reconstructed error signals as the signal predictive of the present error signal.

12. A color video signal coding arrangement according to claim 11 wherein said means for generating the plurality of control signals comprises:

means responsive to the presence of color in the video signal samples of the currently occuring video signal line for generating a first control signal;

means responsive to the presence of color in the video signal samples of the preceding video signal line for generating a second control signal; and means responsive to change of color between the video signal samples of the currently occuring and preceding video signal lines for generating a third control signal; and said means for selecting a predetermined combination of past reconstructed video signals comprises means jointly responsive to the first, second and third control signals for selecting a predetermined combination of past reconstructed video signal samples for the signal predictive of the present video sample signal.

13. A method for coding a color video signal comprising the steps of:

sampling a video signal at a predetermined rate corresponding to m times the color sub-carrier frequency;

generating a signal predictive of the each video signal sample;

forming an error signal representative of the difference between the present video signal sample and the signal predictive of the present video signal sample means;

generating a signal predictive of the error signal;

generating a signal corresponding to the difference between the error signal and the signal predictive thereof; and quantizing the difference signal;

the step of generating a signal predictive of the error signal comprising summing the quantized difference signal and the signal predictive of a preceding error signal to reconstruct the error signal and forming the signal predictive of the next occurring error signal responsive to the reconstructed error signal; and the step of generating a signal predictive of each video signal sample comprising summing the reconstructed error signal and the signal predictive of the m—1th preceding video sample to produce a preceding reconstructed video signal sample and forming the signal predictive of the present video sample signal responsive to the preceding reconstructed video signal.

14. A method for coding a color video signal according to claim 13 further comprising the step of forming a plurality of combinations of past reconstructed video signal samples and a plurality of combinations of past reconstructed error signals responsive the sequence of reconstructed video signal samples; and wherein the step of forming the signal predictive of the next occuring error signal comprises selecting one of the plurality of combinations of past reconstructed error signals as the signal predictive of the next occuring error signal responsive to preceding reconstructed video signal samples.

15. A method for coding a color video signal according to claim 14 wherein the step of forming the signal predictive of the present video sample signal comprises selecting a predetermined combination of past reconstructed video signal samples as the signal predictive of the next occuring video signal sample responsive to preceding reconstructed video signal samples.

16. A method for coding a color video signal according to claim 15 wherein the step of selecting a predetermined combination of past reconstructed video signal samples comprises:
   generating a plurality of control signals responsive to past reconstructed video signal samples of the currently occuring and preceding video signal lines; and
   selecting a predetermined combination of past reconstructed video signal samples as the signal predictive of the present video sample signal responsive to the control signals; and
   selecting a predetermined combination of past reconstructed error signals as the signal predictive of the present error signal responsive to the control signals.

17. A color video signal coding arrangement according to claim 16 wherein the step of generating the plurality of control signals comprises:
   generating a first control signal responsive to the presence of color in the video signal samples of the currently occuring video signal line;
   generating a second control signal responsive to the presence of color in the video signal samples of the preceding video signal line; and
   generating a third control signal responsive to change of color between the video signal samples of the currently occuring and preceding video signal line; and
   the step of selecting a predetermined combination of past reconstructed video signals comprises selecting a predetermined combination of past reconstructed video signal samples for the signal predictive of the present video sample signal jointly responsive to the first, second and third control signals.

* * * * *